Sept. 26, 1950 J. B. KLAUS 2,523,436
SAUSAGE END FILLER
Filed Dec. 28, 1948
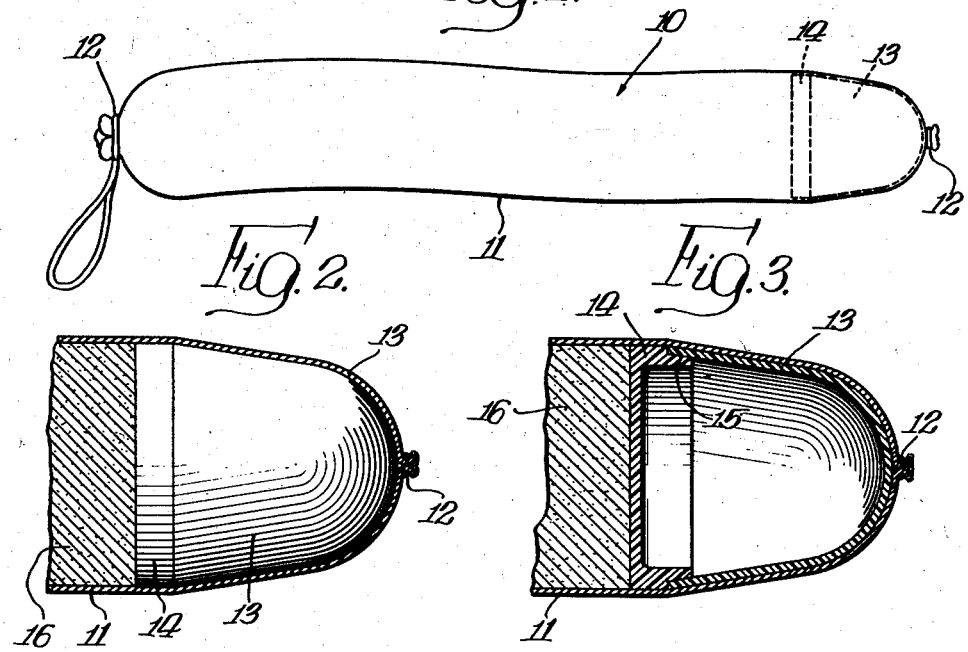
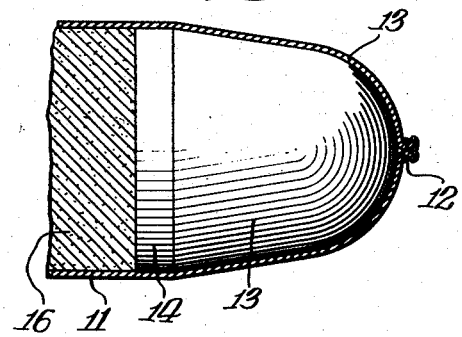
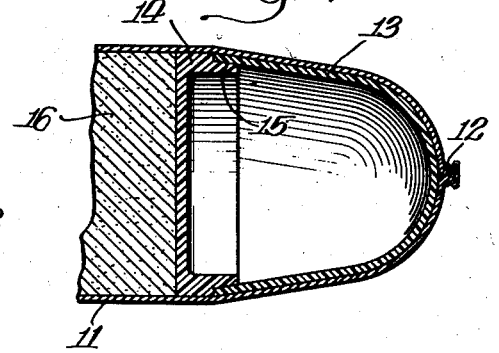
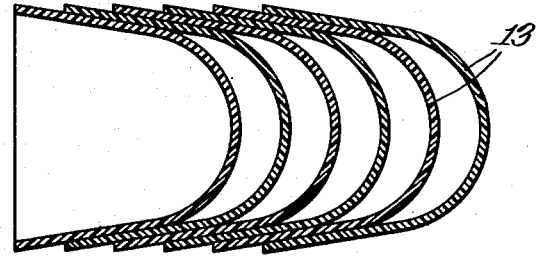
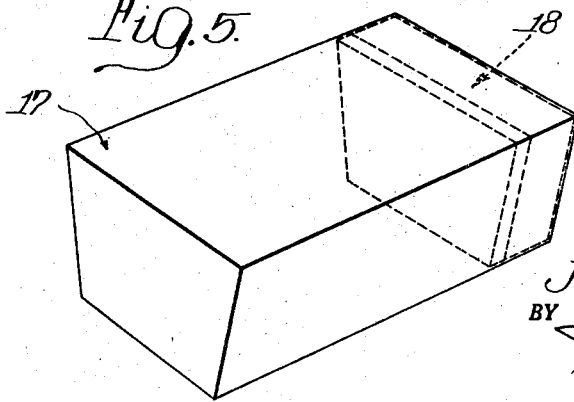
INVENTOR.
John B. Klaus,
BY John P. Smith
Atty.

Patented Sept. 26, 1950

2,523,436

UNITED STATES PATENT OFFICE 2,523,436

SAUSAGE END FILLER

John B. Klaus, Chicago, Ill., assignor of one-half to Leon Tiahnybik, Chicago, Ill.

Application December 28, 1948, Serial No. 67,661

6 Claims. (Cl. 99—175)

The present invention relates generally to a meat saving device, but more particularly to a sausage casing end filler or plug or the like so as to permit the merchant to eliminate waste, overcome sales resistance to the purchase of the tail end of sausages and the like so that when the merchant approaches the end of the sausage, the plug or filler may be discarded without the incidental waste.

Heretofore it has been the practice, in connection with the sale of cold cuts or cold meats, considerable sales resistance has been encountered in the sale of this type of meat when the piece being cut has reached the end portion and under the circumstances, the merchant must throw away the end piece with the resultant loss of the meat contained therein. It is, therefore, one of the primary objects of the present invention to provide a form of end filler for cold meats which may be in the form of plastic or hollow paper plug inserted in the casing or attached to the cold meat end and of a configuration as to conform with the particular piece of meat or sausage to give the sausage or meat the conventional appearance so that when the end of the sausage or meat being cut is reached, the plug or filler may be disposed of without wasting the "tail ends."

A further object of the invention is to provide a novel and improved nested type filler or plug which can be conveniently packaged and shipped to sausage manufacturers so that the same may be readily inserted in one end of the sausage casing in preparing and filling the casing with prepared cold meats.

These and other objects are accomplished by providing a construction and an arrangement of the various parts in the manner hereinafter described and particularly pointed out in the appended claims.

Referring to the drawings:

Fig. 1 is a side elevational view of a conventional form of sausage showing the manner in which my improved filler plug is mounted therein;

Fig. 2 is an enlarged fragmentary cross sectional view showing the manner in which the filler is mounted in the sausage casing;

Fig. 3 is a similar cross sectional view showing the manner in which the cap is attached to the curved conically shaped filler;

Fig. 4 is an enlarged longitudinal cross sectional view showing the manner in which the fillers are nested in shipment; and Fig. 5 is a perspective view of a cold meat loaf showing a prism-like filler attached to one end of the meat loaf or the like.

In illustrating one form of my invention, I have shown the same in connection with a conventional form of sausage, generally indicated by the reference character 10. The sausage in this instance comprises the usual outer casing 11 which, of course, is filled with a variety of conventional sausage meats, for example, liver sausage, Bologna, salami and the like. The casing in this instance is closed and secured at both ends by the usual cord 12, but before the casing is filled, my improved conically shaped and rounded end cup or hollow filler 13, which is provided with a cap or cover 14, is telescopically inserted in one end of the cup by engaging an annular recess 15 in the cap. The cap 14 and the cup or filler 13 are preferably made of plastic, relatively strong paper or any other suitable material and is preferably stained or colored so as to give the same appearance through the casing as the meat 16 contained in the sausage casing.

In order to facilitate the shipping and packaging of the hollow filler or plug 13, it is preferably formed in a conical shape so that a number of these fillers may be nested together, as shown in Fig. 4. This arrangement permits the easy packaging and shipment of the same to sausage manufacturers.

In Fig. 5 of the drawings, I have shown another form of cold meat package which is preferably prism-like in form and generally indicated by the reference character 17. In this instance a similar fill in plug of hollow construction and generally indicated by the reference character 18 may be attached to one end of the meat loaf or supported within the outer casing if the same is enclosed within a casing.

From the above description it will be readily seen that by providing a hollow filler or plug at one end of the sausage casing or the like so as to give the same appearance of the sausage, the sales resistance to the purchase of the "tail end" of the sausage is not only overcome, but the elimination of waste heretofore experienced by the merchandiser is avoided, thereby reducing to a minimum the loss heretofore experienced in the dispensing and sale of sausage and similar cold meats.

While in the above specification I have described one embodiment which my invention may assume in practice, it will, of course, be understood that the same is capable of modification and that modification may be made without departing from the spirit and scope of the invention as expressed in the following claims.

What I claim as my invention and desire to secure by Letters Patent is:

1. An end filler for cold meats having an enclosing member comprising a disposable hollow member attached to the end of the cold meat by said member.

2. An end filler for sausages comprising a hollow member secured to said sausage within said casing.

3. An end filler for a sausage having a casing comprising disposable member mounted in and at one end of said casing.

4. An end filler for a sausage having a casing comprising a hollow disposable member mounted in one end of said casing.

5. An end filler for a sausage having an outside casing comprising a conically shaped member with a hemispherically-shaped end mounted in one end of said casing.

6. An end filler for a sausage having an outside casing for containing the meat therein, and a hollow disposable member conforming to the end shape of said sausage and mounted in one end of said casing.

JOHN B. KLAUS.

REFERENCES CITED

The following references are of record in the file of this patent:

UNITED STATES PATENTS

| Number | Name | Date |
| --- | --- | --- |
| 1,486,445 | Mayol | Mar. 11, 1924 |
| 1,939,450 | Horton | Dec. 12, 1933 |